United States Patent
Chou

[19]
[11] Patent Number: 5,875,519
[45] Date of Patent: Mar. 2, 1999

[54] UNIVERSAL ANGLE WHEEL ASSEMBLY

[76] Inventor: Cheng-Tsan Chou, 58, Ma Yuan West St., Taichung, Taiwan

[21] Appl. No.: 969,732

[22] Filed: Nov. 13, 1997

[51] Int. Cl.$^6$ .................................................... B60B 37/00
[52] U.S. Cl. .............................. 16/46; 301/111; 301/125; 16/44; 190/18 A
[58] Field of Search ................................... 301/111, 125, 301/126, 131, 132, 133, 119; 16/18 R, 45, 46, 20, 21, 44; 190/18 A; 280/86.1, 43.24

[56] References Cited

U.S. PATENT DOCUMENTS

| | | | |
|---|---|---|---|
| 615,155 | 11/1898 | George | 16/44 |
| 1,788,391 | 1/1931 | Green | 16/44 |
| 1,875,965 | 9/1932 | Waters | 16/18 R |
| 2,596,578 | 5/1952 | Mcintyre et al. | 16/18 R |
| 2,996,752 | 8/1961 | Pope | 16/18 R |
| 3,263,266 | 8/1966 | Rabelos et al. | 16/21 |
| 3,337,230 | 8/1967 | Golding | 16/44 |
| 5,575,361 | 11/1996 | Chou | 190/18 A |
| 5,762,168 | 6/1998 | Miyoshi | 190/18 A |

*Primary Examiner*—D. Glenn Dayoan
*Assistant Examiner*—Long Bao Nguyen

[57] ABSTRACT

A universal angle wheel assembly has a wheel holder plate, a main seat disposed on the wheel holder plate, a cover plate disposed on the main seat, a shaft extending from a top portion of the wheel holder plate, and a pivot pin fastening a wheel in the wheel holder plate. A positioning block is disposed in the main seat defining an upper hollow interior and a lower hollow interior. A guide hole is formed on the positioning block. A through hole is formed on a bottom of the main seat. A coiled spring, a bearing, and a cushion ring are inserted in the lower hollow interior. The shaft passes through the through hole, the cushion ring, the bearing, the coiled spring, and the guide hole. A round hole is formed on the shaft. A first positioning pin passes through the cushion ring and the round hole.

3 Claims, 8 Drawing Sheets

5,875,519

UNIVERSAL ANGLE WHEEL ASSEMBLY

BACKGROUND OF THE INVENTION

The present invention relates to a universal angle wheel assembly. More particularly, the present invention relates to a universal angle wheel assembly which can be rotated freely.

A suitcase often has two front wheels and two rear wheels. However, the height of the rear wheels cannot be adjusted. When the user slants the suitcase, the front wheels will be lifted. If the ground is not smooth, the rear wheels which cannot adjust their heights will not be in balance. Therefore, the suitcase may be overturned.

SUMMARY OF THE INVENTION

An object of the present invention is to provide a universal angle wheel assembly which can be rotated in many directions.

Accordingly, a universal angle wheel assembly comprises a wheel holder plate, a main seat disposed on the wheel holder plate, a cover plate disposed on the main seat, a shaft extending from a top portion of the wheel holder plate, and a pivot pin fastening a wheel in the wheel holder plate. A positioning block is disposed in the main seat defining an upper hollow interior and a lower hollow interior. A guide hole is formed on the positioning block. A through hole is formed on a bottom of the main seat. A coiled spring, a bearing, and a cushion ring are inserted in the lower hollow interior. The shaft passes through the through hole, the cushion ring, the bearing, the coiled spring, and the guide hole. A round hole is formed on the shaft. A first positioning pin passes through the cushion ring and the round hole.

DETAILED DESCRIPTION OF THE INVENTION

Figure 1:
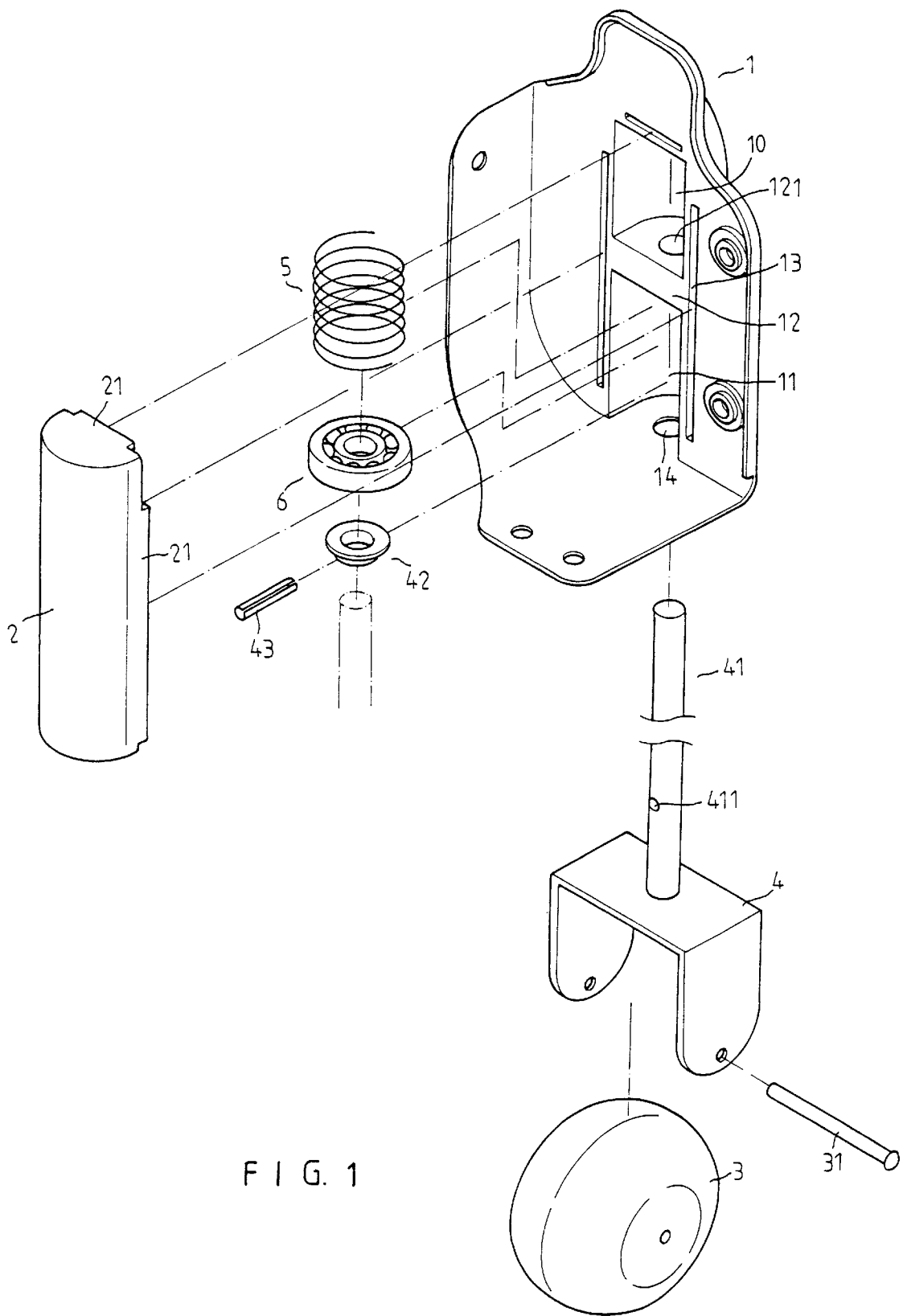
FIG. 1 is a perspective exploded view of a universal angle wheel assembly of a preferred embodiment in accordance with the present invention.
Figure 2:
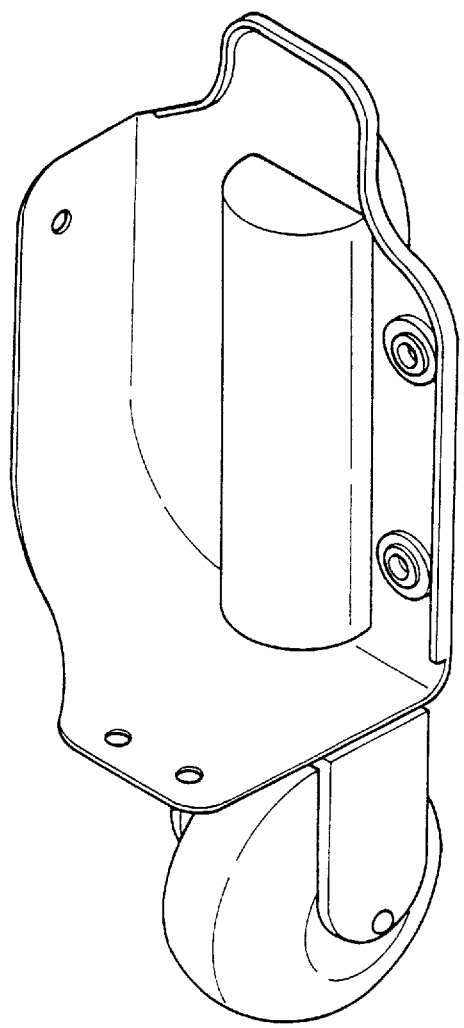
FIG. 2 is a perspective assembly view of a universal angle wheel assembly of a preferred embodiment in accordance with the present invention.
Figure 3:
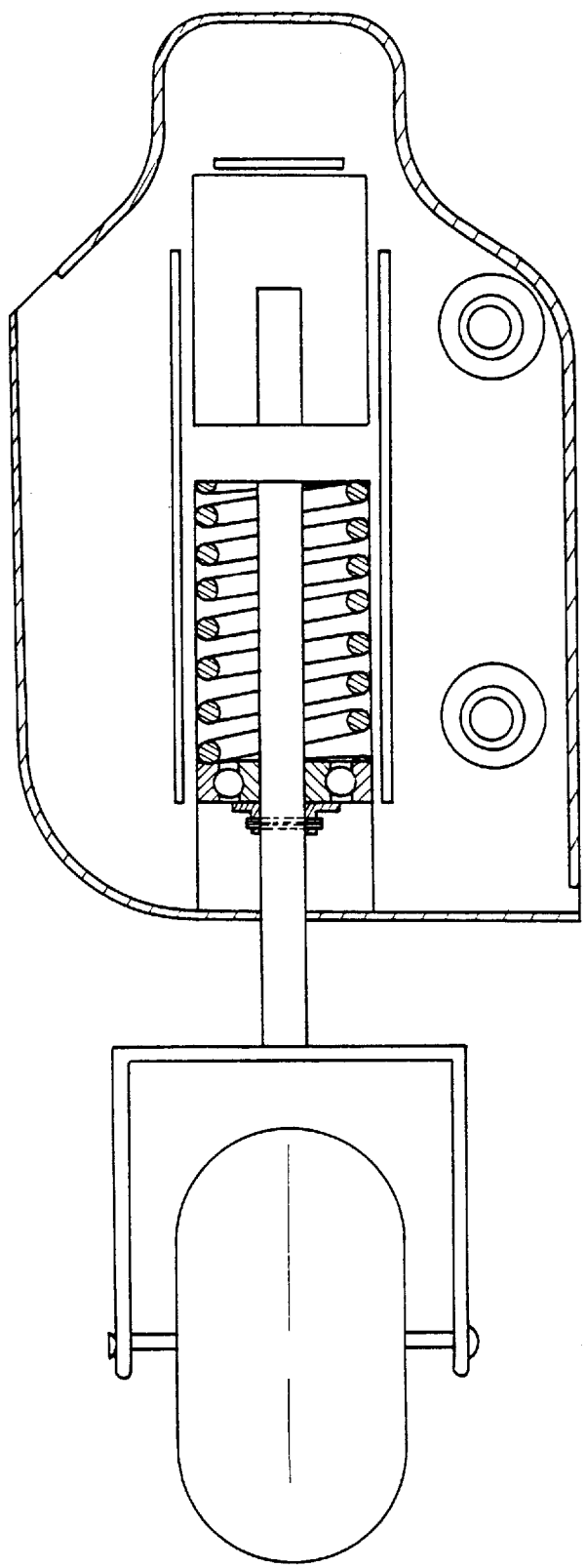
FIG. 3 is a sectional view of FIG. 2 while the universal angle wheel assembly is not operated.
Figure 4:
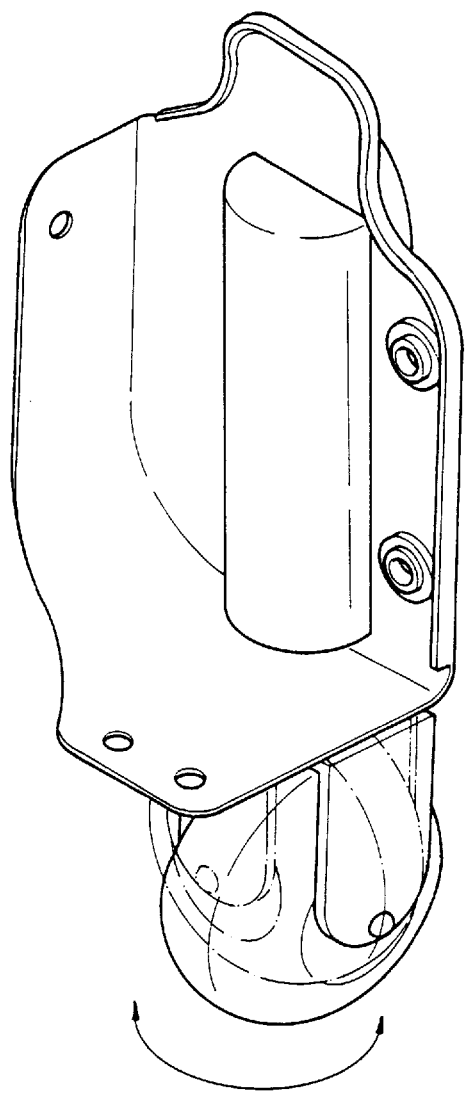
FIG. 4 is a perspective schematic view illustrating an operation of a universal angle wheel assembly of a preferred embodiment in accordance with the present invention.
Figure 5:
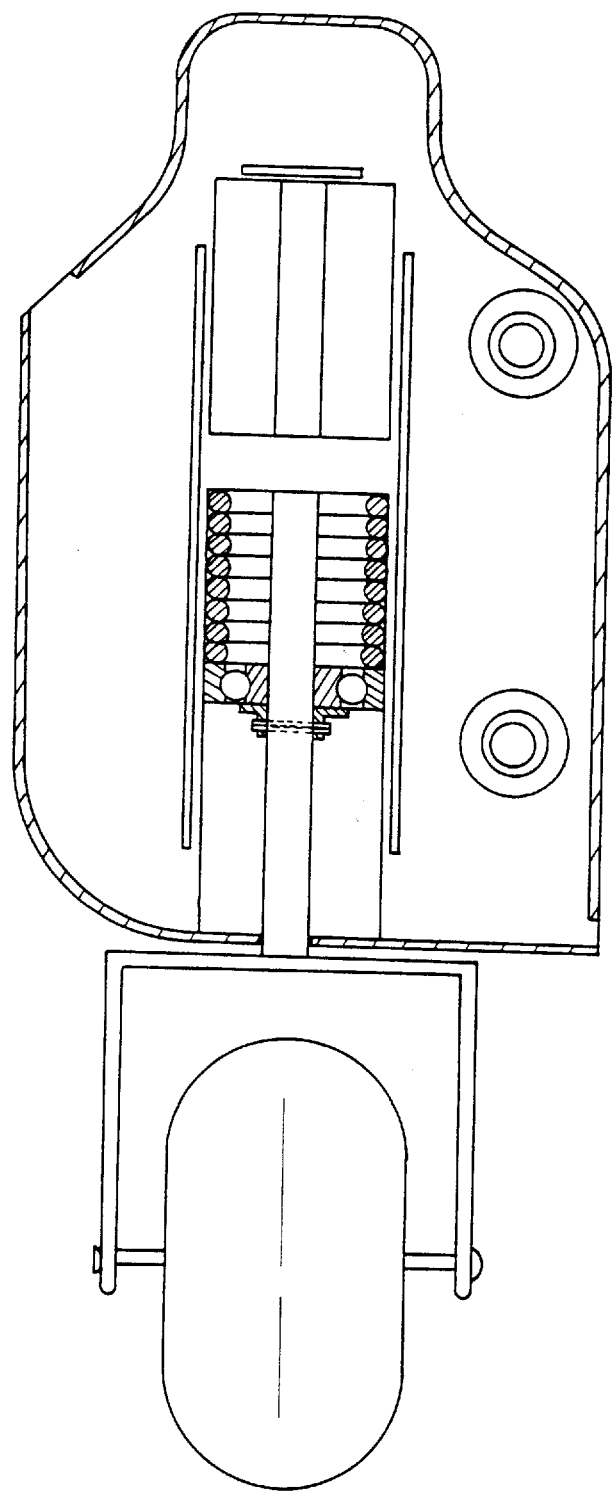
FIG. 5 is a sectional view of FIG. 2 while the universal angle wheel assembly is operated.
Figure 6:
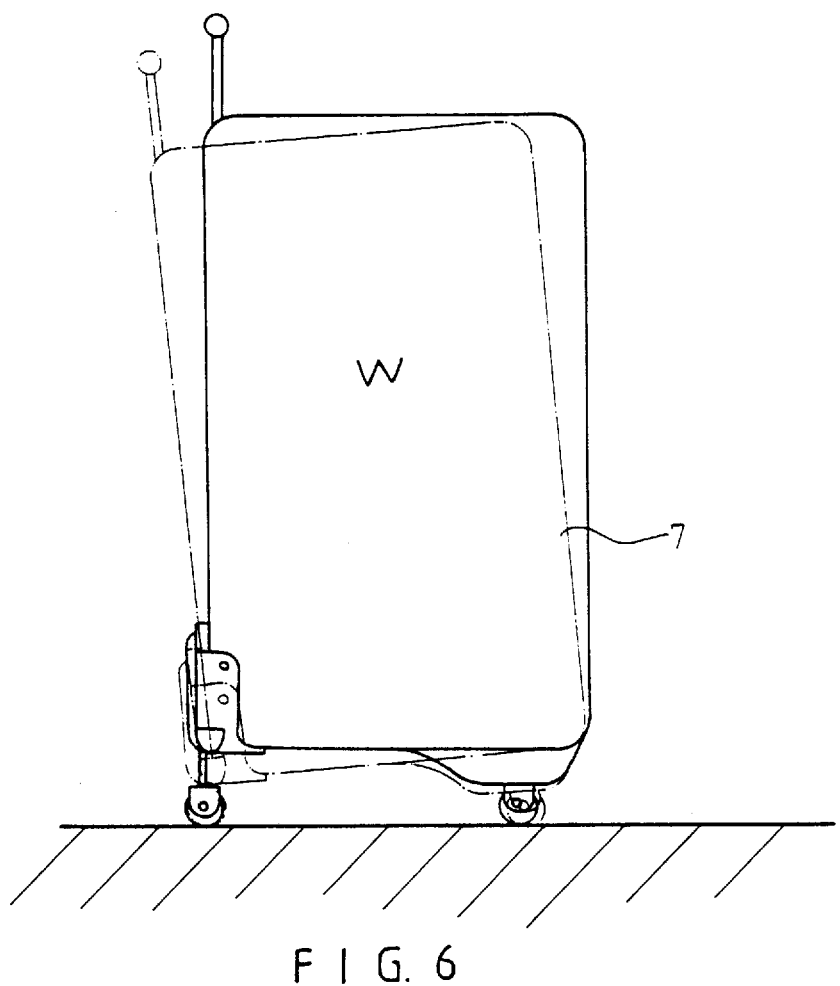
FIG. 6 is a schematic view illustrating a suitcase disposed on a universal angle wheel assembly of a preferred embodiment in accordance with the present invention.
Figure 7:
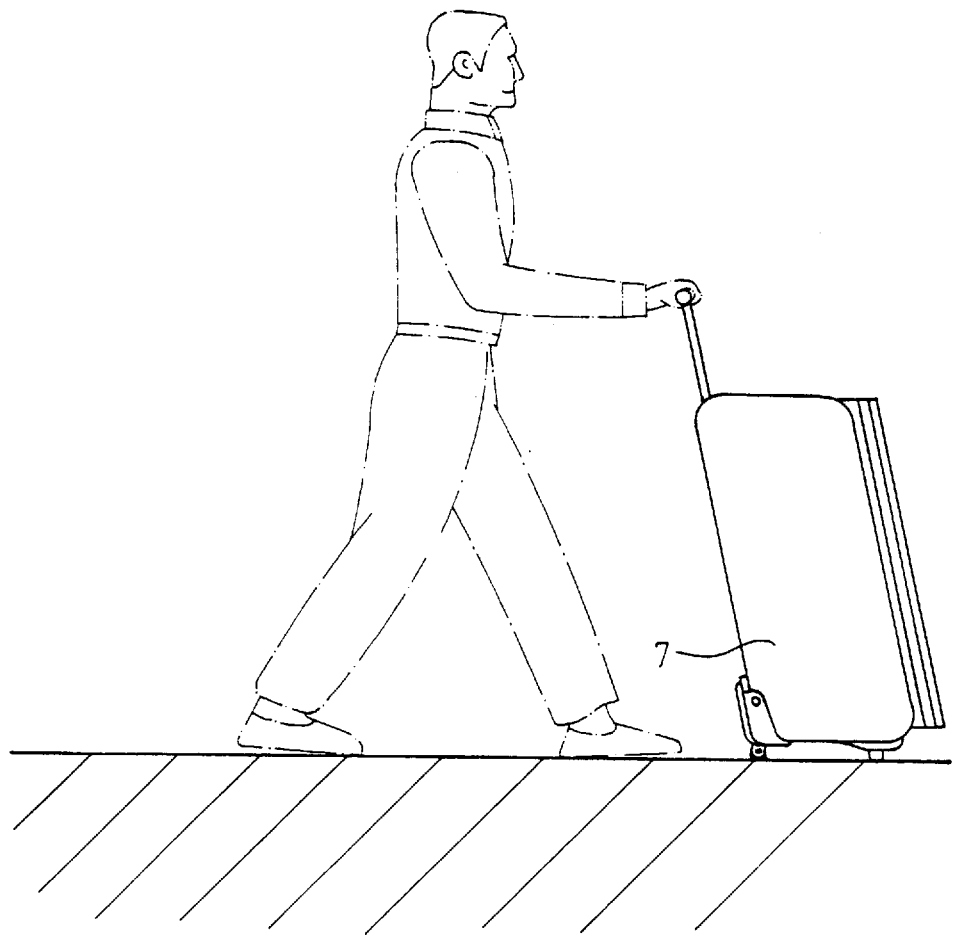
FIG. 7 is a schematic view illustrating a user operating a suitcase.

Referring to FIGS. 1 to 3, a universal angle wheel assembly comprises a wheel holder plate 4, a main seat 1 disposed on the wheel holder plate 4, a cover plate 2 disposed on the main seat 1, a shaft 41 extending from a top portion of the wheel holder plate 4, and a pivot pin 31 fastening a wheel 3 in the wheel holder plate 4. A positioning block 12 is disposed in the main seat 1 defining an upper hollow interior 10 and a lower hollow interior 11. A guide hole 121 is formed on the positioning block 12. A through hole 14 is formed on a bottom of the main seat 1. A coiled spring 5, a bearing 6, and a cushion ring 42 are inserted in the lower hollow interior 11. The shaft 41 passes through the through hole 14, the cushion ring 42, the bearing 6, the coiled spring 5, and the guide hole 121. A round hole 411 is formed on the shaft 41. A first positioning pin 43 passes through the cushion ring 42 and the round hole 411. The cover plate 2 covers the upper hollow interior 10 and the lower hollow interior 11.

A plurality of periphery grooves 13 are formed on the main seat 1 surrounding the upper hollow interior 10 and the lower hollow interior 11.

The cover plate 2 has a plurality of protruded laterals 21 inserted in the periphery grooves 13.

Referring to FIGS. 4 to 7, the wheel 3 can rotate freely because the bearing 6 supports the shaft 41. Now referring to FIG. 5, the coiled spring 5 is compressed so that the main seat 1 approaches the wheel holder plate 4.

The universal angle wheel assembly can be disposed on a rear bottom of a suitcase 7.

Figure 8:
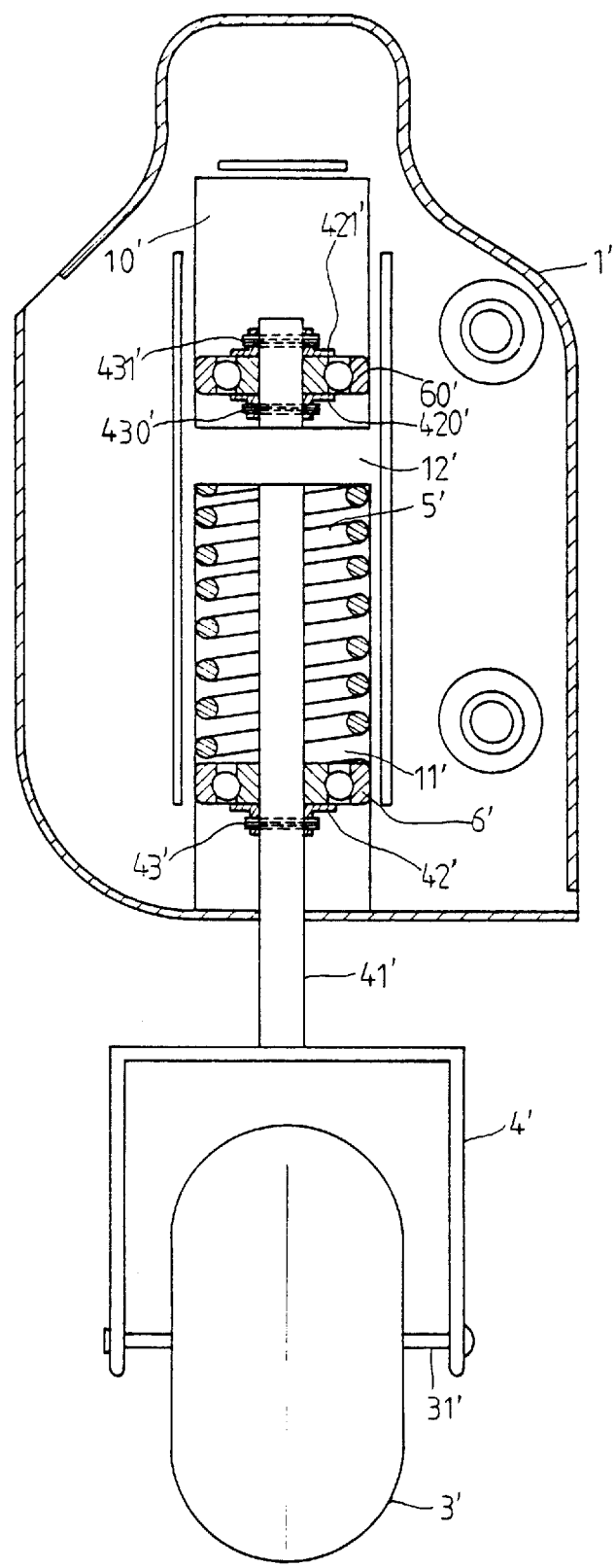
FIG. 8 is a sectional view of a universal angle wheel assembly of another preferred embodiment in accordance with the present invention.

Referring to FIG. 8, another universal angle wheel assembly comprises a wheel holder plate 4', a main seat 1' disposed on the wheel holder plate 4', a shaft 41' extending from a top portion of the wheel holder plate 4', and a pivot pin 31' fastening a wheel 3' in the wheel holder plate 4'. A positioning block 12' is disposed in the main seat 1' defining an upper hollow interior 10' and a lower hollow interior 11'. A guide hole is formed on the positioning block 12'. A through hole is formed on a bottom of the main seat 1'. A coiled spring 5', a bearing 6', and a cushion ring 42' are inserted in the lower hollow interior 11'. The shaft 41' passes through the through hole, the cushion ring 42', the bearing 6', the coiled spring 5', and the guide hole. A round hole is formed on the shaft 41'. A first positioning pin 43' passes through the cushion ring 42' and the round hole. A cover plate (not shown) covers the upper hollow interior 10' and the lower hollow interior 11'. A pad ring 420', an upper bearing 60' and a gasket ring 421' surround the shaft 41'. A second positioning pin 430' passes through the pad ring 420'. A third positioning pin 431' passes through the gasket ring 421'. Therefore, the shaft 41' can be supported stably.

The present invention is not limited to the above embodiments but various modification thereof may be made. Furthermore, various changes in form and detail may be made without departing from the scope of the present invention.

I claim:

1. A universal angle wheel assembly comprises:

a wheel holder plate, a main seat disposed on the wheel holder plate, a shaft extending from a top portion of the wheel holder plate, a pivot pin fastening a wheel in the wheel holder plate, a positioning block disposed in the main seat defining an upper hollow interior and a lower hollow interior, a guide hole formed on the positioning block, a through hole formed on a bottom of the main seat, a coiled spring, a bearing, and a cushion ring inserted in the lower hollow interior, the shaft passing through the through hole, the cushion ring, the bearing, the coiled spring, and the guide hole, a round hole formed on the shaft, a first positioning pin passing through the cushion ring and the round hole, a cover plate covering the upper hollow interior and the lower hollow interior, and a plurality of periphery grooves formed on the main seat surrounding the upper hollow interior and the lower hollow interior.

2. A universal angle wheel assembly as claimed in claim 1, wherein the cover plate has a plurality of protruded laterals inserted in the periphery grooves.

3. A universal angle wheel assembly as claimed in claim 1, wherein a pad ring, an upper bearing and a gasket ring surround the shaft.

* * * * *